(12) United States Patent
Waszak et al.

(10) Patent No.: US 8,358,044 B2
(45) Date of Patent: Jan. 22, 2013

(54) ELECTRIC MACHINE APPARATUS WITH INTEGRATED, HIGH TORQUE DENSITY MAGNETIC GEARING

(75) Inventors: Michal-Wolfgang Waszak, Nandlstadt (DE); Jan Hemmelmann, München (DE); Ronghai Qu, Clifton Park, NY (US); Patrick Lee Jansen, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 1441 days.

(21) Appl. No.: 11/353,569

(22) Filed: Feb. 14, 2006

(65) Prior Publication Data

US 2007/0186692 A1    Aug. 16, 2007

(51) Int. Cl.
*H02K 49/00* (2006.01)

(52) U.S. Cl. .................. 310/103; 310/266

(58) Field of Classification Search ............ 310/20, 310/103, 114–115, 266, 46, 83, 80
See application file for complete search history.

(56) References Cited

U.S. PATENT DOCUMENTS

| | | | |
|---|---|---|---|
| 1,913,371 A * | 6/1933 | Cleaver ............................ 310/96 |
| 2,864,016 A * | 12/1958 | Waltscheff ................ 310/102 R |
| 3,378,710 A | 4/1968 | Martin, Jr. ..................... 310/104 |
| 3,683,249 A * | 8/1972 | Shibata et al. ................ 318/730 |
| 3,700,941 A * | 10/1972 | Duncan ......................... 310/105 |
| 5,696,417 A * | 12/1997 | Arimoto ........................ 310/114 |
| 5,783,893 A * | 7/1998 | Dade et al. .................... 310/266 |
| 5,793,136 A * | 8/1998 | Redzic ........................... 310/114 |
| 6,355,999 B1 * | 3/2002 | Kichiji et al. ................. 310/112 |
| 6,794,781 B2 | 9/2004 | Razzell et al. ................ 310/114 |

OTHER PUBLICATIONS

K. Atallah et al.; "Design, analysis and realization of a high-performance magnetic gear;" *IEEE Proc.-Electr. Power Appl.*, Vo. 151, No. 2, Mar. 2004, pp. 135-143.

K. Atallah et al.; "A Novel High-Performance Magnetic Gear;" *IEEE Transactions of Magnetics*, vol. 37, No. 4, Jul. 2001, pp. 2844-2846.

P. O. Rasmussen et al.; "Development of a High-Performance Magnetic Gear;" *IEEE Transactions of Industry Applications*, vol. 41, No. 3, May/Jun. 2005; pp. 764-770.

* cited by examiner

*Primary Examiner* — Thanh Lam
(74) *Attorney, Agent, or Firm* — Ann M. Agosti

(57) ABSTRACT

An electrical machine apparatus having magnetic gearing embedded therein includes a moveable rotor having a first magnetic field associated therewith, a stator configured with a plurality of stationary stator windings therein, and a magnetic flux modulator interposed between the moveable rotor and the stator windings. The magnetic flux modulator is configured to transmit torque between the first magnetic field associated with said moveable rotor and a second magnetic field excited by the plurality of stationary stator windings.

11 Claims, 7 Drawing Sheets

ELECTRIC MACHINE APPARATUS WITH INTEGRATED, HIGH TORQUE DENSITY MAGNETIC GEARING

BACKGROUND OF THE INVENTION

The present disclosure relates generally to electrical machinery such as motors and generators and, more particularly, to an electrical machine apparatus having high torque density magnetic gearing integrated therein.

Electrical machines (e.g., motors, generators) typically deliver more power at high speeds than at low speeds. In order to adapt a high-speed, rotating electrical machine to a high-torque, lower speed mechanical component (e.g., a prime mover in the case of a generator and a load in the case of a motor), mechanical gear boxes are extensively used as the cost of having a high-speed electrical machine coupled with corresponding mechanical gearing for speed/torque conversion is lower than that for a low-speed electrical machine. As is well known, certain disadvantages are inherent with mechanical gearing such as, for example, acoustic noise, vibration, reliability and the need for lubrication and maintenance, to name a few.

The concept of magnetic gears has also long been in existence, and can potentially offer significant benefits with respect to their mechanical counterparts, primarily as a result of the lack of physical contact between an input shaft and an output shaft. For the most part, magnetic gears have traditionally received relatively little attention in the industry due to the complexity of the proposed designs, as well as the limited torque density such gears can provide. For instance, a magnetic gear assembly arranged in a spur configuration results in only a small fraction of the permanent magnets located on the gears actually contributing to torque conversion at any given time.

More recently, however, a planetary-like magnetic gear arrangement using rare-earth permanent magnets has been proposed, which results in a favorable torque transmission density capability between an outer rotor and an inner rotor. In such a configuration, each of the permanent magnets affixed to the outer rotor and the inner rotor contribute to torque transmission. In view of the existence of a magnetic gearing capability providing comparable transmitted torque density with respect to conventional mechanical gearbox arrangements, it is therefore desirable to be able to provide more functionally integrated electromechanical energy conversion systems that take advantage of this type of non-contact gearing arrangement.

BRIEF DESCRIPTION OF THE INVENTION

The above discussed and other drawbacks and deficiencies of the prior art are overcome or alleviated by an electrical machine apparatus having magnetic gearing embedded therein. In an exemplary embodiment, the machine includes a moveable rotor having a first magnetic field associated therewith, a stator configured with a plurality of stationary stator windings therein, and a magnetic flux modulator interposed between the moveable rotor and the stator windings. The magnetic flux modulator is configured to transmit torque between the first magnetic field associated with said moveable rotor and a second magnetic field excited by the plurality of stationary stator windings.

In another embodiment, a wind turbine generator system includes a wind driven turbine, a generator coupled to the turbine, and a tower connected to the generator. The generator further includes a permanent magnet rotor coupled to the turbine, the rotor having a first magnetic field associated therewith, a stator configured with a plurality of stationary stator windings therein, and a magnetic flux modulator interposed between the moveable rotor and said stator windings. The magnetic flux modulator is configured to transmit torque between the first magnetic field associated with the moveable rotor and a second magnetic field excited by the plurality of stationary stator windings.

In another embodiment, a ship propulsion system includes a propulsion motor configured to rotate a shaft and a propeller coupled to the shaft. The propulsion motor further includes a permanent magnet rotor coupled to the shaft, the rotor having a first magnetic field associated therewith, a stator configured with a plurality of stationary stator windings therein, and a magnetic flux modulator interposed between the moveable rotor and the stator windings. The magnetic flux modulator is configured to transmit torque between the first magnetic field associated with the moveable rotor and a second magnetic field excited by the plurality of stationary stator windings.

BRIEF DESCRIPTION OF THE DRAWINGS

Referring to the exemplary drawings wherein like elements are numbered alike in the several Figures.

DETAILED DESCRIPTION OF THE INVENTION

Disclosed herein a novel electrical machine apparatus having high torque density magnetic gearing integrated therein. As opposed to previously proposed electrical machinery with integrated magnetic gearing therein, the present embodiments provide an even further level of integration by eliminating a second moving part (i.e., rotor), and instead replaces the same with stator armature windings. In a generator configuration, the stator armature windings are excited by electromotive force or, alternatively in a motor configuration, through an external voltage. Consequently, the present design provides the advantages mentioned above with respect to mechanical gearboxes (e.g., contact-less operation, higher reliability, lower maintenance), as well as reduction in mass due to the elimination of a second rotor (or more generally, the elimination of a second moving component).

Figure 1:
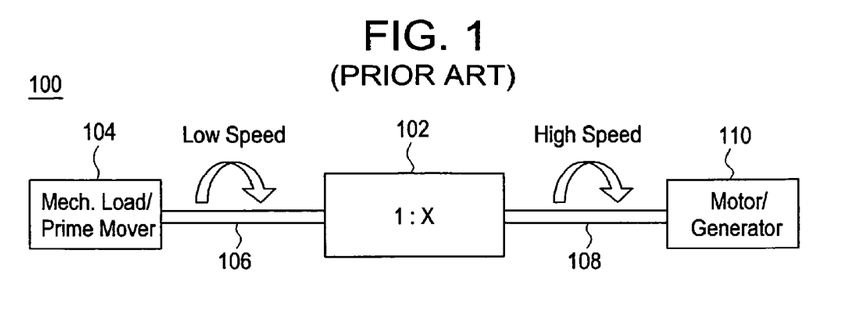
FIG. 1 is a schematic block diagram of a conventional electromechanical energy conversion system employing a mechanical gearbox.

Referring initially to FIG. 1, a schematic block diagram of a conventional electromechanical energy conversion system 100 employing a mechanical gearbox 102 is illustrated. A mechanical load/prime mover 104 is coupled to a low speed rotor shaft 106, which is in turn coupled to the mechanical gearbox 102. In a generator configuration (mechanical to electrical energy conversion), the rotational speed of rotor shaft 106 driven by the prime mover 104 is converted to a high speed rotation of high speed rotor shaft 108 by the mechanical gearbox 102, given by the gear ratio 1:X of the gearbox 102. The high speed rotor shaft 108 then drives the rotor of the generator 110. By way of example, if the low speed shaft 106 turns at 60 rpm and the gear ratio of the gearbox 102 is 1:30, then the high speed shaft 108 is driven at 1800 rpm.

Conversely, in a motor configuration (electrical to mechanical energy conversion), the motor 110 is powered by an electrical power source (not shown) to turn the rotor at a high speed (e.g., 1800 rpm). The gearbox 102 converts the high speed rotation of shaft 108 to a low speed rotation of shaft 106 (e.g., 60 rpm) to drive the mechanical load 104. In either configuration, the gearbox 102 is subject to noise, vibration, and the need for maintenance as outlined above.

Figure 2:
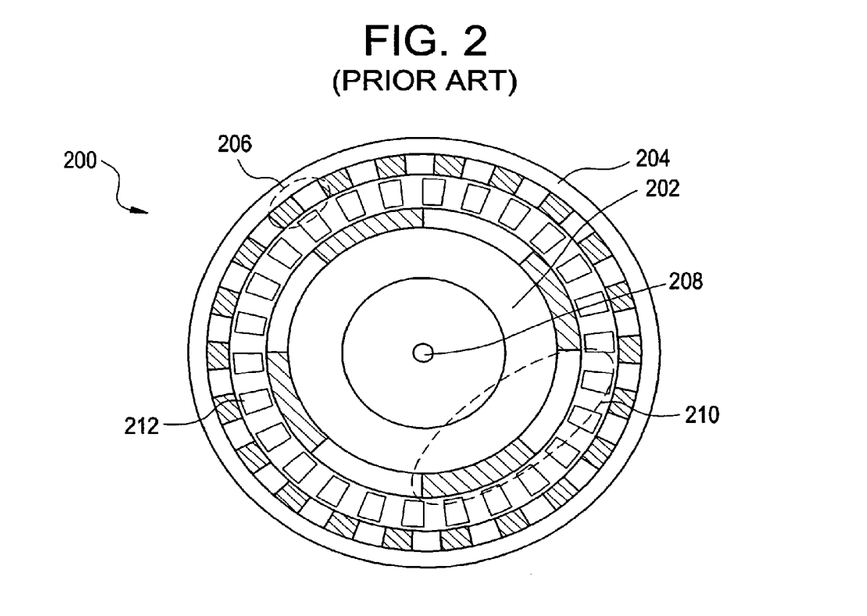
FIG. 2 is a cross sectional view of a recently proposed magnetic gear of a planetary type configuration.

FIG. 2 is a cross sectional view of a recently proposed magnetic gear 200 of a planetary type configuration. A high speed rotor shaft 202 of reduced diameter is supported within and coaxial with a cylindrical low speed rotor shaft 204 of larger diameter. The low speed rotor shaft 204 has a relatively large number ($P_{ls}$) of permanent magnet pole-pairs 206 formed on the inner surface thereof. Individual permanent magnets of the pole-pairs 206 are oriented such that the north and south poles are aligned perpendicularly to a common axis of rotation 208 with respect to the high speed rotor shaft 202. The orientation of the magnets of the pole-pairs 206 alternates, wherein one magnet of the pair has its north pole directed towards the common axis 208 and the adjacent magnet has its south pole directed towards the common axis 208.

The high speed rotor shaft 202 has a smaller number ($P_{hs}$) of permanent magnetic pole-pairs 210 attached to the outer surface thereof. As with the pole-pairs 206 of the low speed rotor shaft 204, the magnets of the pole-pairs 210 are oriented so that the north and south poles of flux are aligned perpendicularly to the common axis of rotation 208. A relatively large number ($N_s$) of stationary soft iron pole-pieces 212 are located between the exterior of the high speed rotor shaft 202 and the interior of the low speed rotor shaft 204 between the magnets of the pole pairs 206 and 210. The stationary pole-pieces 212 are located at a fixed distance from (are evenly distributed about) the common axis 208.

The magnetic gear 200 operates by the locking of one shaft's magnetic field onto a space harmonic of the magnetic field created by the other shaft, facilitated by modulation of the fields by the stationary pole-pieces 212. The gear ratio, G, is given in the simplest case by $G=P_{ls}\div P_{hs}$ when $N_s=P_{ls}+/-P_{hs}$. In the example depicted, there are 4 pole pairs 210 on the high speed shaft 202 and 22 pole pairs 206 on the low speed shaft 204. Accordingly, the low speed rotor shaft 204, when driven at a low speed causes the high speed rotor shaft 202 to rotate at a high speed, thereby transmitting torque from one shaft to the other at a fixed gear ratio of 22÷4=5.5:1.

Figure 3:
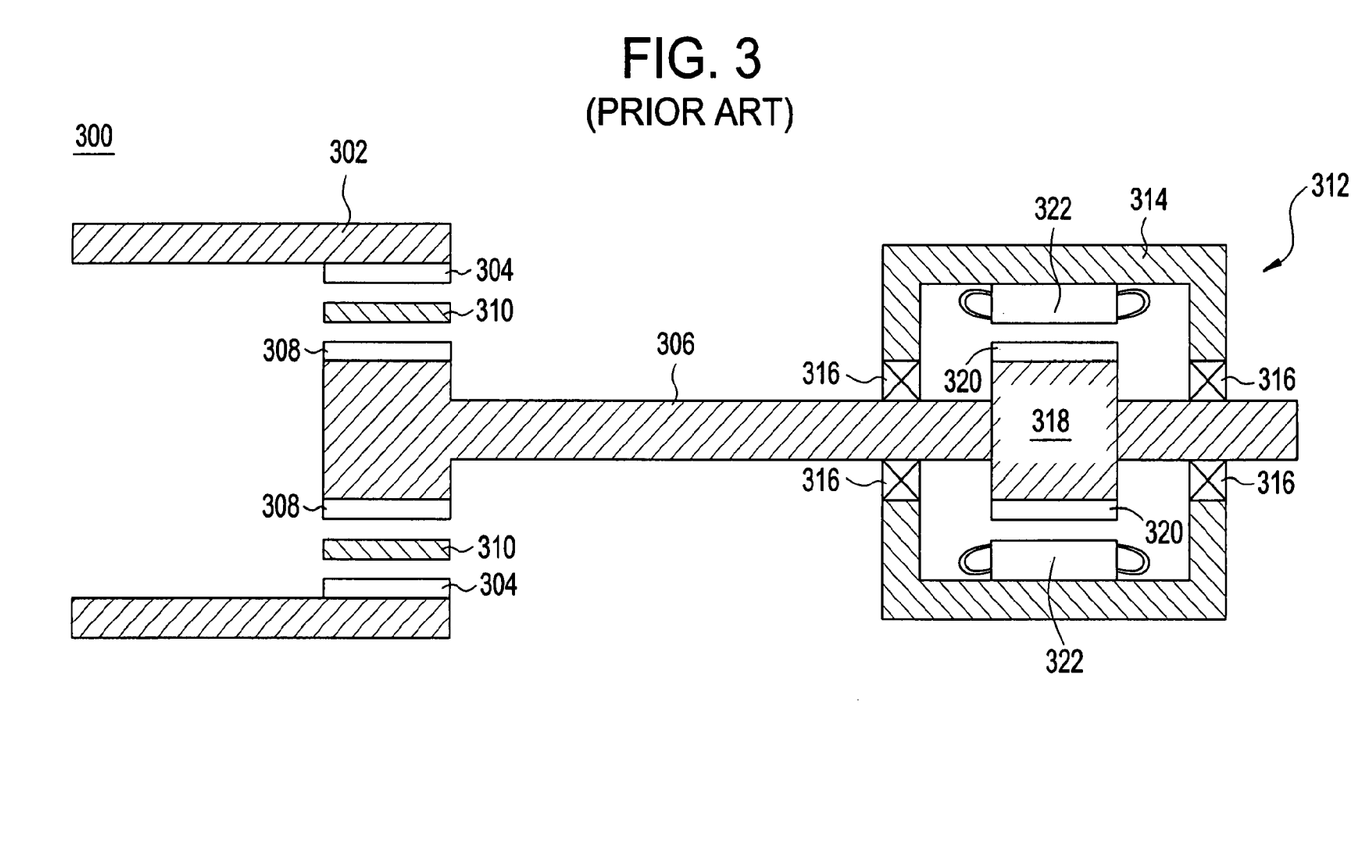
FIG. 3 is a cross sectional view of a previously proposed electromechanical energy conversion system employing a magnetic gear of the type shown in FIG. 2.

In view of the magnetic gear design of FIG. 2, various drive systems have been proposed to incorporate magnetic gearing with high torque transmission density. For instance, FIG. 3 is a cross sectional view of a previously proposed electromechanical energy conversion system 300 employing a magnetic gear of the type shown in FIG. 2. As is shown, a low speed shaft 302 has a plurality of magnetic pole pairs 304 on an inner surface thereof, while a high speed shaft 306 has a plurality of magnetic pole pairs 308 on an outer surface thereof. The magnetic gearing is facilitated through stationary iron pole pieces 310 as described above. Where the system 300 is configured in a generator mode, the low speed shaft 302 is driven by a prime mover (not shown) and the magnetic gearing converts a low rotational speed of the low speed shaft 302 to a high speed rotation of the high speed shaft 306.

In addition, an electric machine 312 includes a housing 314 that receives the high speed shaft 306 therein, supported by bearings 316. A rotor 318 is rotated by the high speed shaft 306 in a generator mode, the rotor 318 including a plurality of magnetic pole pairs 320 disposed on an outer surface thereof. The rotating magnetic fields generated by the high speed rotor 318 induce a voltage in the stator coils of stator 322. Conversely, where electric machine 312 is configured as a motor, an electrical power source (not shown) coupled to the stator windings causes rotation of the rotor 318 and high speed shaft 306. The magnetic gearing translates the high speed rotation to a low speed rotation of low speed shaft 302 coupled to a motor load (not shown).

An additional measure of integration for system 300 has also been implemented, by which the high speed shaft is eliminated. Instead, a high speed rotor is directly magnetically geared to a low speed rotor as described above. The electric machine housing (such as 314 in FIG. 3) is eliminated, and the stator windings of the machine are incorporated into the confines of the low speed rotor (shaft). However, even with this additional integration, such an arrangement still provides for two moving components (i.e., a low speed rotor and a high speed rotor).

Figure 4:
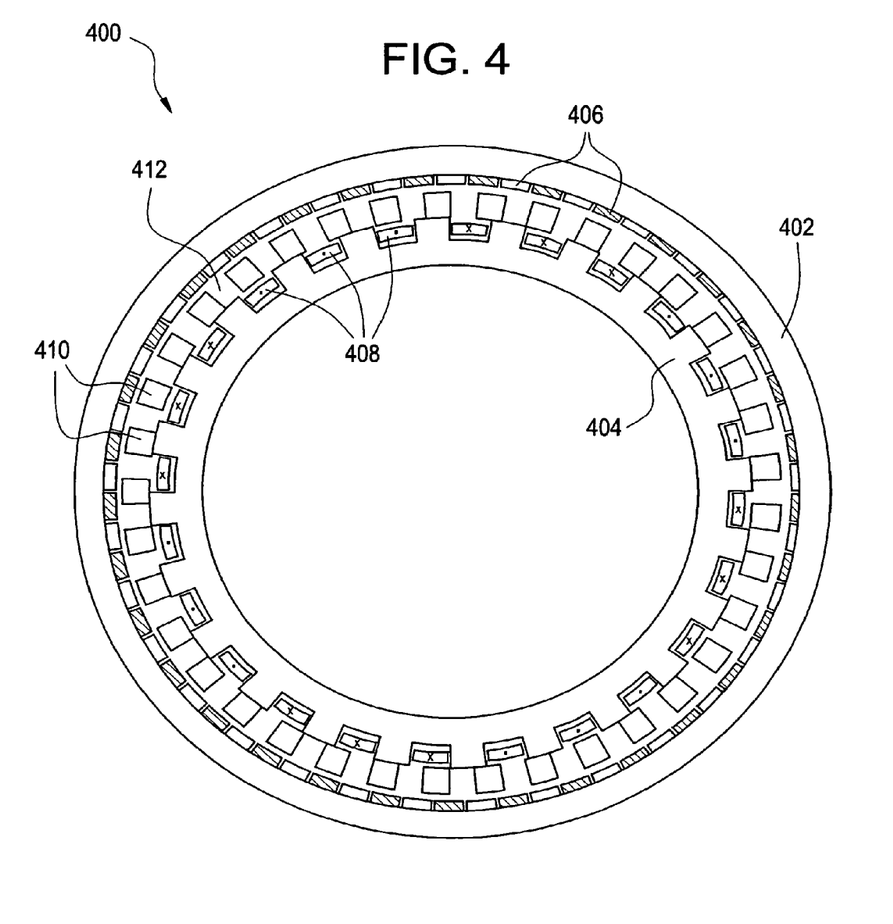
FIG. 4 is a cross sectional view of an electrical machine apparatus having high torque density magnetic gearing integrated therein, in accordance with an embodiment of the invention.

Therefore, in accordance with an embodiment of the invention, FIG. 4 is cross sectional view of an electrical machine apparatus 400 having high torque density magnetic gearing integrated therein, in accordance with an embodiment of the invention. As is shown, the apparatus 400 includes a moveable rotor 402 and a stator 404. In the embodiment depicted, the rotor 402 is outwardly disposed with respect to the stator 404, and thus has a plurality of permanent magnets 406 of alternating orientation formed on an inner surface thereof. However, whereas the previously discussed magnetic gearing arrangements provide for a second rotor with permanent magnets, the present arrangement replaces the second rotor with stationary stator windings 408. In addition, a plurality of stationary iron pole-pieces 410 are disposed within the air gap 412 present between the rotor magnets 406 and the stator windings 408.

Figure 5:
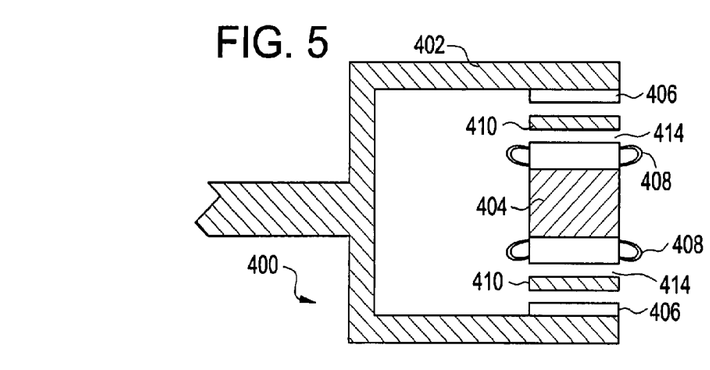
FIG. 5 is a side cross sectional view of the electrical machine apparatus of FIG. 4.
Figure 6:
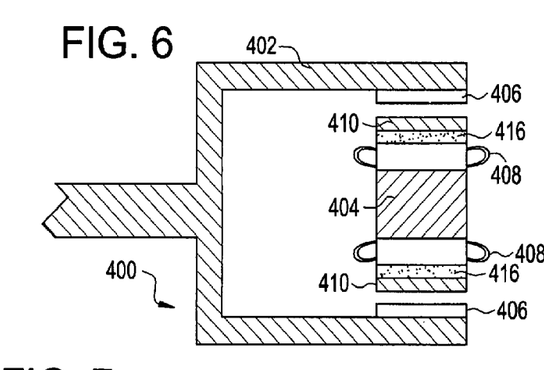
FIG. 6 is side cross sectional view of an alternative embodiment of the electrical machine apparatus of FIG. 5.

Depending upon the machine requirements, the pole-pieces 410 may be mounted to the stator frame 404 (e.g., by stamping them from the same lamination sheet as the stator material) or may be separately mounted. In addition, an air gap 414 may be present between the stator frame 404 and the pole-pieces 410 (as shown in FIG. 5) or, alternatively, a non-magnetic material 416 may be inserted between the stator frame 404 and the pole-pieces 410 (as shown in FIG. 6).

In any case, the stationary pole-pieces 410 facilitate torque transmission between the magnetic field excited by the permanent magnet rotor 402 and the magnetic field excited by the stationary windings 408. In the specific example of FIG. 4, the machine 400 includes are 33 permanent magnet pole pairs on the rotor 402, 4 winding pole pairs, and 37 pole-pieces 410. Thus, the "gear" ratio from the low speed side (rotor 402 in this case) to the high speed side (stator 404 in this case) is 1:8.25. Advantageously, the torque density provided by the present configuration allows for a significant reduction in machine size, resulting in a cost and mass savings.

Figure 7:
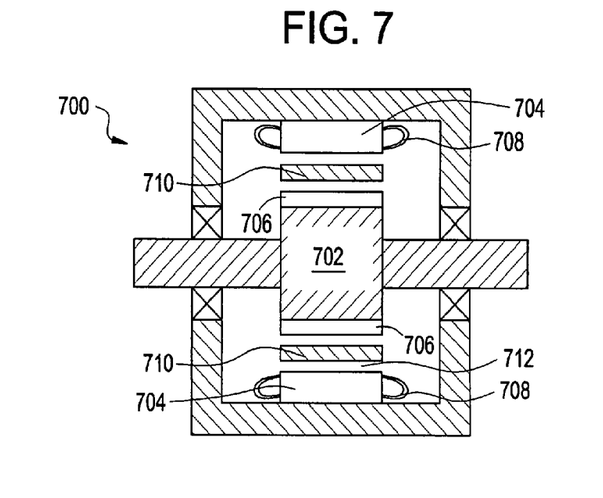
FIG. 7 is side cross sectional view of an alternative embodiment of the electrical machine apparatus of FIGS. 4 and 5.

As indicated above, an outer rotor/inner stator is one possible configuration for the electrical machine apparatus with integrated magnetic gearing. On the other hand, FIG. 7 is side cross sectional view of an alternative embodiment of an electrical machine apparatus 700 having an inner permanent magnet rotor 702 and an outer stator 704. In this example, the permanent magnets 706 are formed on an outer surface of the rotor 702. Again, in the integrated magnetic gearing arrangement, a second rotor is instead replaced with stationary stator windings 708, with a plurality of stationary iron pole-pieces 710 disposed between the rotor magnets 706 and the stator windings 708. As with the earlier embodiments, there may be an air gap 712 between pole-pieces 710 and the stator 704 (as shown in FIG. 7), a non-magnetic material (not shown) disposed therebetween, or the pole-pieces 710 can be directly attached to the stator 704. The embodiment of FIG. 7 may be used, for example, in high shaft speed applications where the number of rotor pole pairs is less than the number of stator pole pairs.

Figure 8:
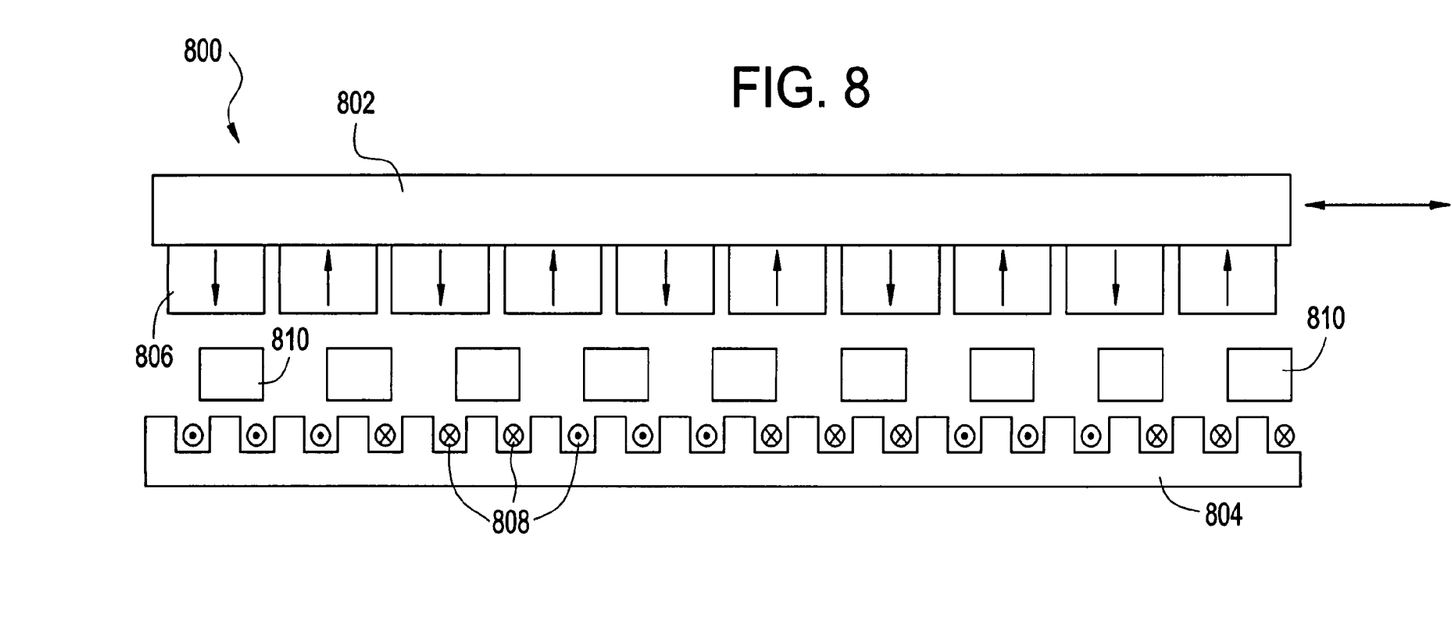
FIG. 8 is a side view of a linear electrical machine apparatus having high torque density magnetic gearing integrated therein, in accordance with still another embodiment of the invention.

In addition to rotating machines, it will further be appreciated that the presently disclosed magnetic gearing concept may also be applied to the area of linear electric machines (i.e., motors or generators). Linear generators have been proposed as suitable energy conversion devices for ocean wave energy plants, linear motors for electromagnetic valves for internal combustion engines and compressor valves, or for general high force density transportation purposes, such as machine tools for example. As opposed to a rotor that spins about an axis of rotation, the rotor of a linear electric machine moves laterally back and forth around a center of rotation at an infinite distance. The electromagnetic flux in the air gap of a linear machine is the same as for rotational machinery. FIG. 8 is a side view of a linear electrical machine apparatus 800 having high torque density magnetic gearing integrated therein, in accordance with still another embodiment of the invention.

As in the case of a rotary machine, the linear electrical machine 800 includes a linearly movable rotor 802 and a stator 804. In this embodiment, the permanent magnets 806 are formed on the inner surface of the rotor 802 facing the stator 804. Again, in the integrated magnetic gearing arrangement, a second rotor is instead replaced with stationary three-phase stator windings 808, and a plurality of stationary iron pole-pieces 810 disposed between the rotor magnets 806 and the stator windings 808 serving as a flux modulator. The linear machine 800 may include an air gap 812 between pole-pieces 810 and the stator 804 (as shown in FIG. 8), a non-magnetic material (not shown) disposed therebetween, or the pole-pieces 810 can also be directly attached to the stator 704.

In the various embodiments depicted above, the rotors of the electrical machines are implemented with permanent magnet rotors. However, it is also contemplated that the integrated magnetic gearing may also be accomplished through the use of rotors having wound field, squirrel cage, or switched reluctance poles. In other words, the rotor's magnetic field may be implemented through DC powered electromagnets, in lieu of permanent magnets. Furthermore, with regard to the stationary pole-pieces that serve as flux modulation devices, the shape of such pieces may be embodied by other insert shapes in addition to square inserts, such as oval or trapezoidal shapes for example.

Although the winding configurations specifically illustrated in FIGS. 4 and 8 depict three-phase windings, it should also be understood that a different number of phases may be used as well.

Figure 9:
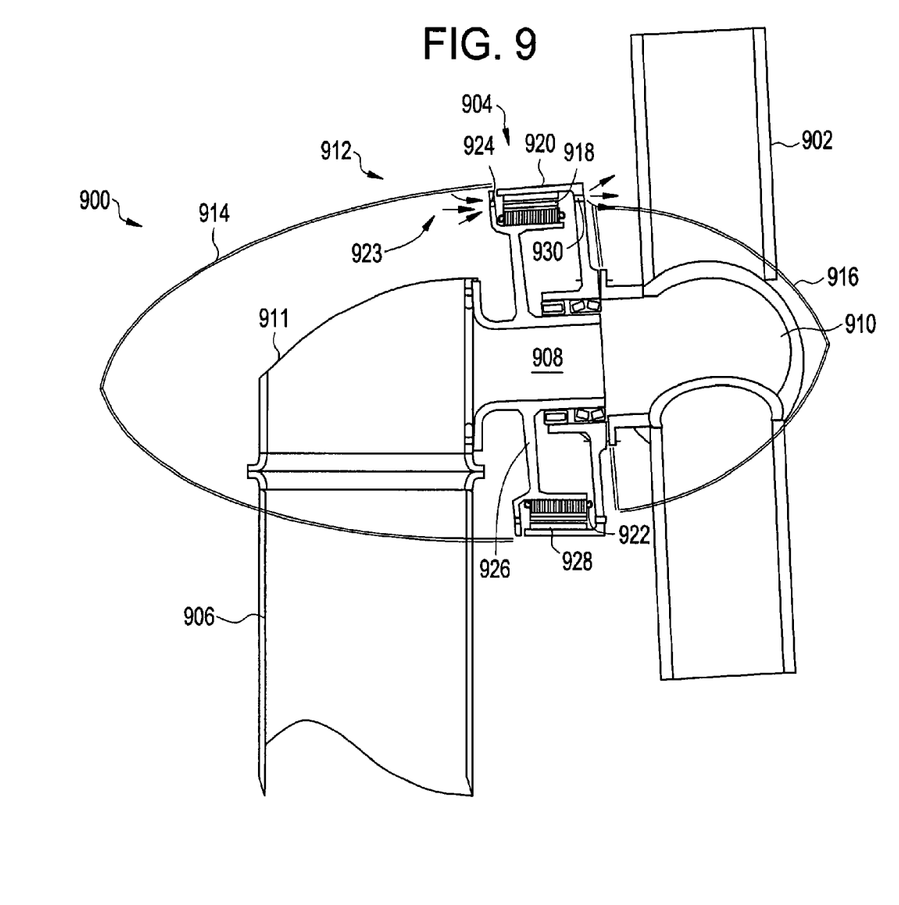
FIG. 9 is a side cross sectional view of a wind turbine generator system utilizing high torque density magnetic gearing integrated therein, in accordance with another embodiment of the invention.
Figure 10:
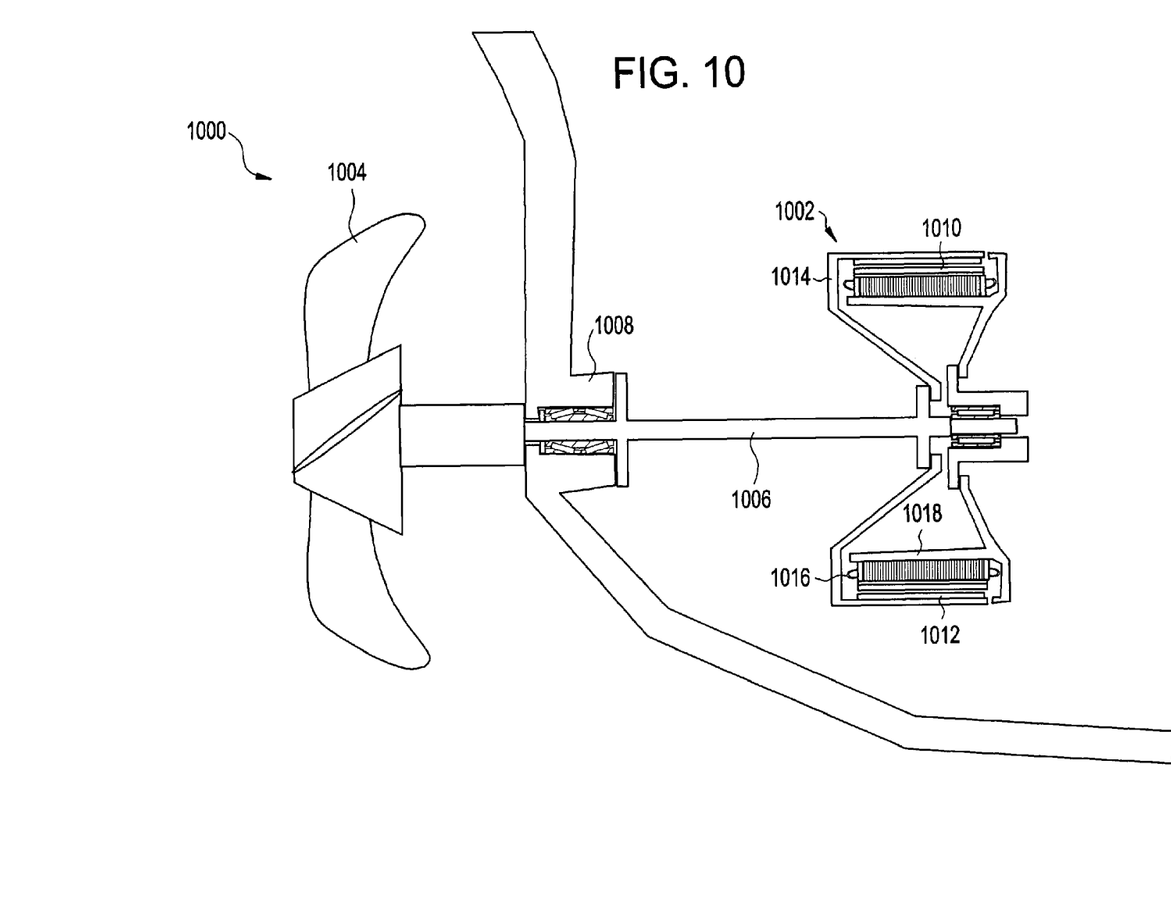
FIG. 10 is a side cross sectional view of a ship propulsion system and motor utilizing high torque density magnetic gearing integrated therein, in accordance with another embodiment of the invention.

Finally, FIGS. 9 and 10 illustrate exemplary applications for one or more of the electrical machine embodiments described herein. For instance, FIG. 9 is a side cross sectional view of a wind turbine generator system 900 utilizing high torque density magnetic gearing integrated therein, in accordance with another embodiment of the invention. The system 900 includes a wind driven turbine 902, wind turbine generator 904, and tower 906. As is known in the art, the blades of the turbine 902 are attached to a main shaft and bearing assembly 908 through a rotor blade hub 910. A main frame 911 of nacelle 912 is attached to the main shaft assembly 908 and sits atop the tower 906. A nacelle cover 914 protects the components inside the nacelle 912, while a rotor hub cover 916 protects the rotor blade hub 910.

Unlike a conventional wind turbine generator system with mechanical gearing, the turbine generator 904 incorporates the above described magnetic gearing by providing the flux modulating stationary pole pieces 918 between the permanent magnet rotor 920 and the stator windings 922. In an exemplary embodiment, the generator 904 includes 88 rotor pole pairs, 8 stator pole pairs and 96 iron pole-pieces 918, yielding an 11:1 gear ratio. Other gear ratios, however, are also contemplated.

Cooling of the turbine generator 904 may be accomplished by circulation of air 923 through holes 924 within the stator frame 926, passing through the air gap between the permanent magnets 928 of the rotor 920 and the stator windings 922, and out through holes 930 in the rotor 920. The cooling air path could also be run in the reverse direction.

As opposed to other wind turbine systems with direct drive generators operating at low speeds, the integrated turbine generator 904 is implementable at a significantly reduced diameter (and therefore reduced mass) to lower costs. For example, existing wind turbine generators operating at around the 4.5 MW range are about 10 meters in diameter. Such a size presents formidable transportation and assembly challenges, both at the factories and the turbine site. In order to enable cost-effective, land-based transportation, the generators should be preferably limited to about 4 meters or less in diameter, or be modular in construction. Alternative cooling means commonly used by conventional electric machines are also applicable to the disclosed embodiments.

Referring to FIG. 10, a motor application for the integrated magnetic gearing machine is illustrated. In particular, FIG. 10 illustrates a ship propulsion system 1000 including an inboard propulsion motor 1002 used to drive an outboard propeller 1004 through rotation of a shaft 1006 secured by a mounting and bearing assembly 1008. Again, the propulsion motor 1002 provides direct drive at a reduced size through the use of the high torque transmission density pole pieces 1010 positioned between the permanent magnets 1012 of the rotor 1014 and the windings 1016 of the stator 1018. Although not specifically shown in FIG. 10, the propulsion motor 1002 may utilize a cooling configuration similar to that shown in FIG. 9.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An electrical machine apparatus with integrated magnetic gearing, comprising:
   a moveable rotor having a first magnetic field associated therewith;
   a stator disposed within said moveable rotor, said stator configured with a plurality of stationary stator windings therein; and
   a plurality of stationary pole-pieces disposed in an air gap between said moveable rotor and said stator windings, said plurality of stationary pole-pieces configured to transmit torque between said first magnetic field associated with said moveable rotor and a second magnetic field excited by said plurality of stationary stator windings.

2. The apparatus of claim 1, wherein said rotor comprises a permanent magnet rotor.

3. The apparatus of claim 1, wherein a number of pole pairs of said rotor ($P_{ls}$), a number of pole pairs of said stator ($P_{hs}$), and a number of said pole-pieces ($N_s$) is selected in accordance with the expression $N_s = P_{ls} +/- P_{hs}$.

4. The apparatus of claim 3, wherein said rotor comprises a low speed rotor with respect to a high speed variation of said second magnetic field associated with said stator windings.

5. The apparatus of claim 3, wherein said rotor is configured to rotate about an axis of rotation.

6. The apparatus of claim 5, further comprising an air gap disposed between said stator and said pole-pieces.

7. The apparatus of claim 5, further comprising a non-magnetic material inserted between said stator and said pole-pieces.

8. The apparatus of claim 5, wherein said pole-pieces are attached to a frame supporting said stator.

9. The apparatus of claim 3, wherein said rotor is configured to rotate about an axis of rotation, and said stator is outwardly disposed from said axis of rotation with respect to said rotor.

10. The apparatus of claim 9, wherein said rotor comprises a high speed rotor with respect to a low speed variation of said second magnetic field associated with said stator windings.

11. The apparatus of claim 3, wherein said rotor is configured to move laterally in a linear electric machine configuration.

* * * * *